United States Patent [19]
Ray

[11] Patent Number: 5,876,053
[45] Date of Patent: Mar. 2, 1999

[54] CONVEYER DRIVE SYSTEM

[76] Inventor: Rex Russell Ray, 242 Baron, Grand Prairie, Tex. 75051

[21] Appl. No.: 701,633

[22] Filed: Aug. 22, 1996

[51] Int. Cl.$^6$ ....................................................... B62M 1/00
[52] U.S. Cl. ......................... 280/252; 74/594.4; 280/261; 474/218
[58] Field of Search .................................. 280/250, 249, 280/262, 252, 261, 253; 74/594.4, 594.2; 474/145, 218, 273; 59/3, 93

[56] References Cited

U.S. PATENT DOCUMENTS

| | | | |
|---|---|---|---|
| 3,820,820 | 6/1974 | Kutz ......................................... | 280/252 |
| 4,173,154 | 11/1979 | Sawmiller ................................ | 280/252 |
| 5,683,321 | 11/1997 | Barnett ..................................... | 280/255 |
| 5,690,345 | 11/1997 | Kiser ........................................ | 280/210 |

FOREIGN PATENT DOCUMENTS

| | | | |
|---|---|---|---|
| 0501211 | 1/1976 | U.S.S.R. ................................ | 474/218 |

*Primary Examiner*—Anne Marie Boehler
*Attorney, Agent, or Firm*—Akin, Gump, Strauss Hauer & Feld, L.L.P.

[57] ABSTRACT

A pedal drive system imparts a rotational force, in part, through linear travel of the pedal. The system comprises parallel, dislocated first and second rotating shafts. A first left sprocket and a first right sprocket are each mounted on the first shaft. A second left sprocket and a second right sprocket are each mounted on the second shaft. A left chain is looped around the first left sprocket and the second left sprocket and engages the teeth of those sprockets. A right chain is, likewise, looped around the first right sprocket and the second right sprocket and engages the teeth of those sprockets. A right pedal is affixed to the right chain, and a left pedal is affixed to the left chain. The first shaft is affixed with a forward sprocket for rotation with the first left and first right sprockets. A driven wheel is affixed with a rearward sprocket. A drive chain is looped around the forward sprocket and the rearward sprocket, and engages the teeth of those sprockets. As force is applied to the pedals causing the first and second left sprockets and the first and second right sprockets to rotate, the forward sprocket rotates moving the drive chain. As the drive chain moves with rotation of the forward sprocket, the drive chain rotates the rearward sprocket because of the engagement of the rearward sprocket teeth with the chain.

14 Claims, 2 Drawing Sheets

CONVEYER DRIVE SYSTEM

BACKGROUND OF THE INVENTION

The present invention relates, in general, to drive systems and, more particularly, to a pedal drive system for imparting a rotational force through linear travel of the pedal.

The conventional bicycle is an example of a device that employs a crank and sprocket drive system. That type drive system utilizes the force supplied by a rider to pedals traveling in circular paths in order to generate rotational motion propelling the bicycle in a forward direction. Typically, bicycles include two opposing rotatingly mounted cranks. The cranks are drivingly connected through a chain to a rear wheel of the bicycle which is in contact with a stationary surface, such as the ground. Pedals are attached to the ends of the cranks. A seat is provided on the bicycle for supporting a rider. A rider may mount the bicycle by positioning himself on the seat of the bicycle and placing his feet on the pedals of the bicycle. To propel the bicycle forward, the rider exerts force through his feet against the pedals, thereby causing the cranks to rotate, and thus creating a torque. The torque is transferred via the chain to the rear wheel, thereby causing the rear wheel to rotate. The friction of the rotating wheel against the stationary surface causes the bicycle to move forward.

A drawback to the foregoing system for propelling a bicycle is that, as the rider imparts force to the pedals of the bicycle, his feet are constrained to move in a circular manner. It can be appreciated that the rider induces, through the cranks, a torque with respect to each pedal and crank that is equal to the product of the force applied to the pedal times the length of the crank perpendicular to that force, i.e., the moment arm. The moment arm is proportional to the leverage, or mechanical advantage, of the bicycle for transmitting force supplied by the rider to the wheels to thereby propel the bicycle.

The forces exertable by a bicyclist on rotating pedals are primarily directed vertically downward. This is the case because both the rider's weight due to gravity and the rider's leg strength due to the human physique create primarily vertically downward directed forces when the rider is positioned on the bicycle. When a crank moving through its circular path of motion is generally horizontal with respect to the surface and continuing downward movement in the circular path, therefore, the moment arm is the entire length of the crank. Hence, the mechanical advantage is maximized when the crank is so positioned. When a crank moving through its circular path of motion is generally vertical with respect to the surface and beginning downward movement in the circular path, (i.e., when the pedal is at the top of the circular path of motion), however, then the moment arm is zero. Hence, the mechanical advantage is minimized when the crank is so positioned. As the respective cranks of the typical bicycle rotate along their circular paths between vertical and horizontal positions, the mechanical advantage ranges between maximum and minimum values directly proportional to the maximum and minimum length of the moment arms.

Unfortunately, the maximum mechanical advantage is achieved only instantaneously (i.e., for less than one degree of rotational travel) as the crank passes through the horizontal position and continues its circular path. As the crank moves from the horizontal position to the vertical position at the bottom of the circular path, the mechanical advantage decreases from maximum to minimum. As the mechanical advantage decreases, the energy exerted by the rider becomes less efficiently utilized. It can be shown, assuming a rider's energy is utilized with 100% efficiency when the cranks in their rotation are horizontal (i.e., because of the rider's weight and strength directed downward), that the average efficiency with which his energy is utilized as he pedals in a circular path is about 64%, as calculated by averaging the sine of each of the 360 degrees of the path of the two cranks. Such inefficient utilization of energy is readily appreciated when the rider attempts to accelerate his bicycle from a stationary position by exerting downwardly directed forces while the cranks are positioned vertically. Similar inefficiency is also observed when a driver accelerates an automobile from a stationary position in a high gear instead of a low gear. Energy is, thus, not efficiently utilized and acceleration and speed maintenance is, thus, greatly impeded.

Therefore, what is needed is a drive system in which a substantially maximum mechanical advantage is sustained, and in which fluctuation of the mechanical advantage is minimized, over the full stroke of the drive system.

SUMMARY OF THE INVENTION

Embodiments of the present invention, accordingly, provide a drive system in which a maximum mechanical advantage is sustained and in which fluctuation of the mechanical advantage is minimized. To this end, the drive system of certain embodiments comprises first and second shafts rotatably mounted, first and second sprockets mounted on the first shaft, and first and second sprockets mounted on the second shaft. First and second pedals are mounted in respective first and second pedal sprockets. A first chain drivingly connects together the first sprockets on the first and second shafts, a portion of which first chain is wrapped around the first pedal sprocket, thereby forming a first loop, and a first master link secures closure of the first loop so that the first pedal sprocket is secured therein. Similarly, a second chain drivingly connects the second sprockets on the first and second shafts, a portion of which second chain is wrapped around the second pedal sprocket, thereby forming a second loop, and a second master link secures closure of the second loop so that the second pedal sprocket is maintained engaged therewith. The application of force to the first and second pedals, respectively, causes the first and second chains to rotate the first and second sprockets, respectively, each mounted on the first shaft, thereby rotating the first shaft. The first shaft is connected for driving a wheel on a bicycle or exercise bike, a propeller on a boat or a flying machine, a shaft on a paddle boat, or any crank and sprocket device.

Advantages achieved, with the present invention include increased efficiency of use of a rider's energy over the efficiency of use achieved with a conventional rotating crank drive system.

Another advantage achieved with the present invention is that a substantially maximum mechanical advantage may be sustained over virtually a full stroke of the drive system.

Another advantage achieved with the present invention is that the primarily linear, rather than circular, stroke of the drive system maximizes efficient use of a primarily unidirectional force applied to operate the drive system; for example, in the case of a bicycle, the rider's weight and leg strength are directed primarily downward along the direction of the linear stroke of the drive system, for a given force applied to a pedal of the drive system.

Yet another advantage achieved with the present invention is that the torque generated and transmitted remains relatively constant.

Even more, another advantage of the present invention is that the primarily linear stroke of the drive system is continuous.

DETAILED DESCRIPTION OF THE PREFERRED EMBODIMENT

Figure 1:
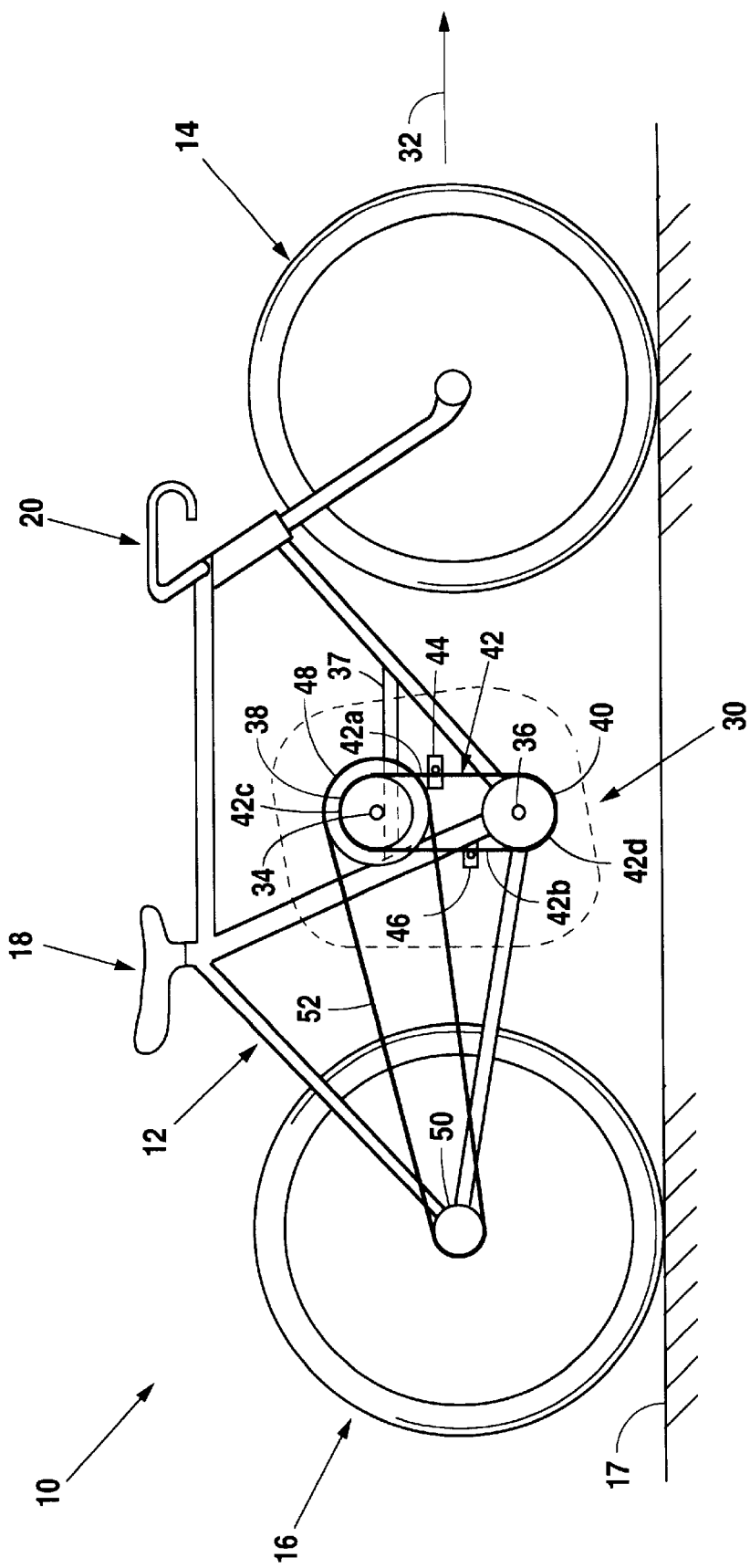
FIG. 1 is an elevational view of a bicycle incorporating the drive system of the present invention.

Referring to FIG. 1, the reference numeral 10 refers, in general, to a bicycle incorporating a drive system 30 of the present invention. The bicycle 10 includes a bicycle frame 12 having a front steering wheel 14 and a rear drive wheel 16 attached generally to the forward and rear ends of the frame 12, respectively. Each of the wheels 14 and 16 frictionally engages a stationary surface 17, such as the ground. A seat 18 is mounted at an upper mid-portion of the frame 12 for supporting a rider (not shown) on the bicycle 10. Also attached at an upper portion of the frame 12 at its forward end is handlebars 20. The handlebars 20 engage the front steering wheel 14 for controlling the path of the bicycle 10 as it moves relative to the stationary surface 17. The foregoing aspects of the bicycle 10 of the invention are conventional and, therefore, are not described in further detail.

In addition to the conventional aspects of the bicycle just discussed, the bicycle 10 of certain embodiments of the invention includes the drive system 30. The drive system 30 serves to propel the bicycle in a forward direction indicated by an arrow 32 in FIG. 1. The drive system 30 includes parallel upper and lower shafts 34 and 36, respectively (each shown on end and extending into the page in FIG. 1). The upper shaft 34 is rotatably mounted on a cross-member 37. The cross-member 37 extends across and is secured with the bicycle frame 12 at such a location as to place the upper shaft 34 from about 8 inches to about 12 inches above the lower shaft 36. As those skilled in the art will know and appreciate, the ideal location of the upper shaft 34 in relation to the lower shaft 36 depends upon a variety of factors, including the diameter and desired relative location of sprockets, size of the bicycle, and other factors. Although the relative location has been described as about 8 inches to about 12 inches apart, that is not intended to limit the invention to that range, as the range can be greater depending upon the application and other circumstances and conditions. The lower shaft 36 is rotatably mounted to the bicycle frame 12 directly below the upper shaft 34, in approximately the same general location as that of the crank and pedal shaft of the conventional bicycle.

An upper and a lower sprocket 38 and 40 are mounted to an end of each of the upper shaft 34 and lower shaft 36, respectively, for rotation therewith. A looped bicycle chain 42 is positioned around each of the sprockets 38 and 40 for engaging teeth (not detailed) of each of the sprockets 38 and 40. The bicycle 10 also includes another set of upper and lower sprockets (not shown) mounted to the other end of each of the upper shaft 34 and lower shaft 36, respectively. Those upper and lower sprockets (not shown) also engage another looped bicycle chain (not shown) positioned around each of these sprockets in a substantially identical manner.

A right pedal 44 is affixed with the looped chain 42 in the manner hereinafter described in detail. A left pedal 46 is attached with the other looped chain (not shown) in similar manner, at a location opposite that of the right pedal 44. It can be appreciated that the looped chain 42 and the other looped chain (not shown) each travel in "conveyor belt" paths around the sprockets 38 and 40 and the other sprockets (not shown), respectively. The path of the chain 42 includes forward and rearward linear portions 42a and 42b, respectively, and upper and lower arcuate portions 42c and 42d, respectively. The path of the other looped chain also includes similar (but laterally dislocated from the chain 42) forward and rearward linear portions and upper and lower arcuate portions.

Additionally, the drive system 30 includes a forward sprocket 48 and a rearward sprocket 50. The forward sprocket 48 is mounted on the upper shaft 34 and rotates therewith. The rearward sprocket 50 is rotatably mounted at a rearward location of the frame 12, in generally the same location as the mounting of the rear wheel 16 of the conventional bicycle. The rearward sprocket 50 engages the rear wheel 16 in such a manner that rotation of the rearward sprocket 50 rotates the rear wheel 16. A looped bicycle drive chain 52 is positioned around each of the forward sprocket 48 and the rearward sprocket 50. The drive chain 52 engages teeth (not shown) of each of the sprockets 48 and 50, so that rotation of either of the sprockets 48 or 50 moves the chain 52, which chain 52 rotates the other of the sprockets 50 or 48, as applicable.

Figure 2A:
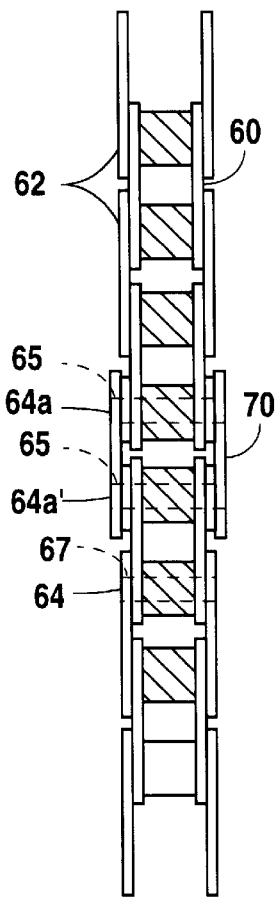
FIG. 2A is an elevational end view of a looped bicycle chain of the drive system of FIG. 1.
Figure 2B:
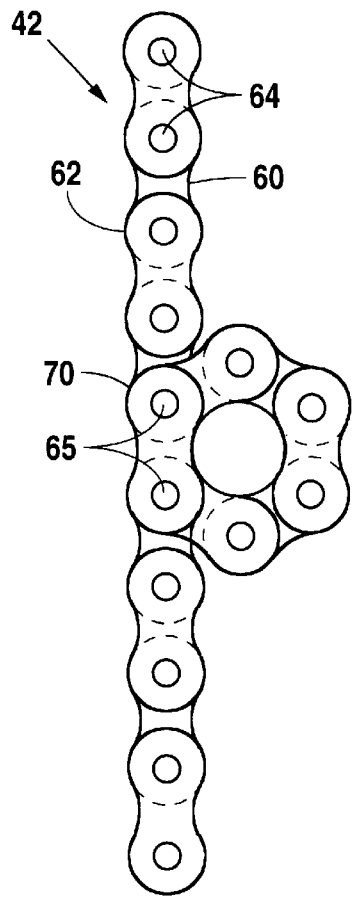
FIG. 2B is an elevational side view of the looped bicycle chain of FIG. 2A.
Figure 2C:
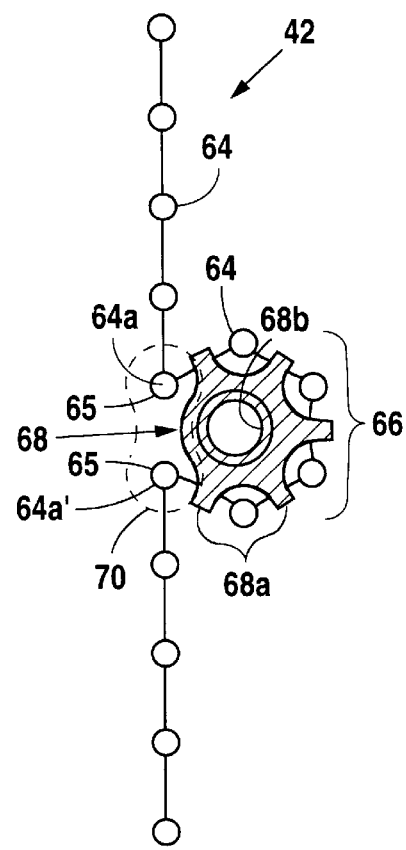
FIG. 2C is a diagrammatic view of the looped bicycle chain of FIG. 2B with a master link (in phantom), showing a pedal sprocket disposed therein in a manner for acceptance of the master link to affix the pedal sprocket with the looped bicycle chain.

FIGS. 2A, 2B, and 2C show a portion of the looped chain 42. The portion of the looped chain 42 illustrates attachment of the right pedal 44 (shown in FIG. 1) to the chain 42. The chain 42 may be the same type of chain conventionally employed in bicycle drive systems. The chain 42 is comprised of a plurality of inner and outer links 60 and 62. The inner links 60 and outer links 62 are each pivotally coupled at pivot points 64, in a conventional manner. A segment 66 of the chain 42 is formed into a loop, and wrapped around and engaged with teeth of a pedal sprocket 68. The pedal sprocket 68 has a threaded bore 68b for receiving a threaded pedal shaft (not shown) on which the right pedal 44 (shown in FIG. 1) rotates. The right pedal 44 and pedal shaft unit are conventional. Movement of the pedal shaft moves the chain 42 along the path of the chain around the upper sprocket 38 and lower sprocket 40.

The chain 42, as wrapped around and engaged with the teeth of the pedal sprocket 68, is secured with the pedal sprocket 68 by a master link 70 (shown in FIGS. 2A–B, and shown in phantom in FIG. 2C). The master link 70 is substantially identical to a single outer link 62. The pivot points 64a and 64a' (shown in FIG. 2C) include special rods 65 (shown on end in FIGS. 2B–C and in lengthwise phantom in FIG. 2A). The special rods 65 are each slightly longer, such as by the thickness of two master links 70, than a typical pivot rod 67. Each master link 70 is placed on opposing special rods 65 of the chain 42 as wrapped around the pedal sprocket 68. The master links 70, as so placed, maintain the chain 42 in wrapped engagement with the pedal sprocket 68.

Referring to FIG. 2C, specifically, the pedal sprocket 68 includes, for example, five teeth 68a. The teeth 68a are spaced so that they will mesh with the segment 66 of the chain 42 wrapping the pedal sprocket 68, but not with the master link 70 between the pivot points 64a and 64a'. The pedal sprocket 68 with five teeth 68a spaced to engage the chain 42 as wrapped, but not the master link 70 portion of the chain 42, may be obtained by removing one of the teeth 68a of a six-toothed sprocket. Of course, as will be understood and appreciated by those skilled in the art, the particular number of teeth 68a of the pedal sprocket 68 and the particular number of removed teeth will be dictated by the particular chain 42 and pedal sprocket 68 size and configuration. Among the various alternative pedal sprocket 68 and chain 42 possibilities, it is of significant importance that the particular attachment of the pedal sprocket 68 to the chain 42 not impair or impede the travel of the chain 42 around the upper sprocket 38 and the lower sprocket 40 via engagement of the chain 42 with the teeth (not shown) of those sprockets 38 and 40. Although that attachment of the chain 42 and the pedal sprocket 68 is specifically described here as a wrap of the chain 42 around the pedal sprocket 68 having one of the teeth 68a at the master link 70 removed, other means and possibilities for that attachment, for example, welding, bolting, and others, are intended as included in the invention.

The left pedal 46 (shown in FIG. 1) is secured to the other chain (not shown) in similar manner, and the arrangement of the left pedal 46 with its upper and lower sprockets and chain are substantially the mirror image of the arrangement of the right pedal 44 with its upper and lower sprockets 38 and 40 and chain 42.

In operation, a rider may position himself on the seat 18 of the bicycle 10 in a conventional manner and engage his feet with the pedals 44 and 46. To propel the bicycle 10 forward, i.e, in the direction indicated by the arrow 32, when the right pedal 44 is positioned on the forward portion 42a of the path traveled by the chain 42 as shown in FIG. 1, the rider applies a force, primarily downward because of the rider's weight and leg strength, through his feet to the right pedal 44. The pedal 44 then travels downward, and, as it completes its travel through the forward portion 42a of the path traveled by the chain 42, it passes through the lower arcuate portion 42d. Thereafter, the pedal 44 enters the rearward portion 42b of the path, thereby resembling the motion of a conveyor belt. At that time, the left pedal 46 enters the forward portion of the path traveled by the other chain (not shown). As a force, also primarily downward for the same reasons, is applied to the left pedal 46, the pedal 46 moves downward. As the rider applies sufficient force with his feet to, alternately, one pedal 44 or 46 and then the other pedal 46 or 44, and as the respective pedals 44 and 46 travel over the forward chain path portions and the rearward chain path portions, the bicycle 10 is propelled forward.

This operation of propelling the bicycle 10 via the pedals 44 and 46 can be understood by discussing the path of the right pedal 44. As the right pedal 44 passes the top of the upper arcuate path 42c of the chain 42, the right pedal 44 begins a downward path. This downward path occurs as the pedal 44 completes the upper arcuate portion 42c, the forward portion 42a, and half of the lower arcuate portion 42d of the path of the chain 42 around the upper and lower sprockets 38 and 40. In that downward path, the force applied by the rider causes the upper and lower sprockets 38 and 40 to rotate as the chain 42 moves in engagement with teeth (not shown) of the sprockets 38 and 40. The upper sprocket 38, being fixed in rotation with the forward sprocket 48, causes the forward sprocket 48 to rotate with rotation of the upper sprocket 38. Because the forward sprocket 48 has teeth (not shown) which engage the drive chain 52, the drive chain 52 moves in its path around the drive sprocket 48 and the rearward sprocket 50. The rearward sprocket 50, likewise, includes teeth (not shown) engaging the drive chain 52, and so rotation of the forward sprocket 48 moves the drive chain 52 thereby rotating the rearward sprocket 50. The rearward wheel 16 rotates as the rearward sprocket 50 rotates. A rider may, therefore, propel the bicycle 10 forward by applying downward force to the pedal 44 in such manner.

When the right pedal 44 completes its downward path, the left pedal 46 begins its downward path with the other chain (not shown). As the right pedal 44 moved downward, as previously described, the left pedal 46 moved upward. As the left peddle 46 now moves downward, the right pedal 44 moves upward with the chain 42 as the upper and lower sprockets 38 and 40 are rotated because of the engagement of their teeth (not shown) with the chain 42.

It can be appreciated that if the rider's feet are secured to the pedals 44 and 46, then the rider may additionally apply upward force to pull the pedals 44 and 46 upwardly when the respective pedals 44 and 40 are traveling upwards along the paths of the rear half of the lower arcuate portion 42d, the rearward portion 42b, and the rear half of the upper arcuate portion 42c of the chain 42 and corresponding rearward portion of the other chain (not shown). Force may, thus, be alternately applied to move the right and left chains downwardly as they travel the paths of the respective forward portions, and upwardly as they travel the paths of the respective rearward portions.

As those skilled in the art will know and appreciate, the drive system 30 may be readily retrofitted to existing bicycles. Alternatively, new bicycles could be equipped with the drive system 30 in lieu of the conventional pedal and crank systems. The materials, attachment mechanisms and methods, and other construction and design particulars, such as materials and implementations, are generally conventional, and the scope of the claims is not intended to be limited to any particular ones of those.

The present invention has several advantages. For example, as the rider applies force to the pedals 44 and 46, the moment arm, i.e., the leverage or mechanical advantage, through which the force is applied, is a maximum while the pedals travel through the linear portions (e.g., 42a and 42b) of their paths of motion, the distance of which linear portions may be approximately equal to the distance between the centers of the upper and lower shafts 34 and 36. Therefore, fluctuation of the moment arm and torque is minimized, and a substantially maximum constant torque is generated and transmitted to the rear wheel 16, thereby providing for more efficient and conservative utilization of force supplied by the rider to propel the bicycle 10 forward. In contrast to the 64% average efficiency of a conventional bicycle 10, discussed above, an average efficiency of over 90%, by certain calculations of an average efficiency based on 64% efficiency as the pedal 44 travels around the upper and lower sprockets 38 and 40 and 100% efficiency as the pedal 44 travels between the upper and lower sprockets 38 and 40, may be readily attained using the drive system 30 of the present invention for the bicycle 10. Furthermore, although it may be difficult to exactly quantify, it is apparent that improved physiological efficiency is also attained because the rider's legs are able to exert their greatest force when they are nearly straight. With the drive system 30, the rider's leg is substantially straight when the pedal 44 or 46 corresponding to that leg is near the lower end of the downward stroke. A conventional drive at that point would, no doubt, be much less than 64% efficient, whereas the present drive 30 would be substantially near 100% efficient.

Numerous variations, modifications, supplementation, and improvements may be made in keeping with the foregoing description. The drive system 30, for example, may be used in replacement of or addition to any crank and sprocket drive device, such as, for example, a bicycle or exercise bike for driving a wheel, a boat or a flying machine for driving a propeller, or a paddle boat for driving a shaft. Furthermore, the drive system 30 may be adapted for use in virtually any other instance in which rotational movement against a resistance is desired.

Many alternative configurations and implementations are also possible. The forward and rearward portions 42a and 42b of the chain 42 and the corresponding portions of the other chain may, for example, be configured to be either parallel or skewed relative to each other. Also, forward sprocket 48 may alternatively be positioned on the lower shaft 36. The shafts 34 and 36 may be positioned and supported in any number of different ways. For example, the shafts 34 and 36 may be horizontally aligned as, for example, in a paddle boat. The shaft 34 alternatively may be positioned directly on the frame 12, thereby obviating the need for the cross-member 37. Even more, a separate drive structure may be provided for supporting the shafts 34 and 36.

Of course, relative dimensions of elements shown in FIGS. 1–2C may be altered. Also, the sprockets 48 and 50 may be supplemented with additional sprockets arranged so that the bicycle 10 is provided with multiple sprocket ratios, or, "speeds", such as, for example, ten speeds. The sprockets 38 and 40 may further be similarly or dissimilarly sized. They may also be adapted for carrying a double chain on each side of the bicycle 10.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A drive system, comprising:
    first and second shafts rotatable about respective first and second longitudinal axes;
    first and second sprockets mounted on the first shaft;
    first and second sprockets mounted on the second shaft;
    first and second pedals;
    first and second pedal sprockets for receiving respective first and second pedals;
    a first chain drivingly connecting the first sprockets on the first and second shafts, a portion of which first chain is wrapped around the first pedal sprocket, thereby forming a first loop;
    a first master link for securing closure of the first loop so that the first pedal sprocket is secured therein;
    a second chain drivingly connecting the second sprockets on the first and second shafts, a portion of which second chain is wrapped around the second pedal sprocket, thereby forming a second loop;
    a second master link for securing closure of the second loop so that the second pedal sprocket is secured therein; and
    wherein the application of force, respectively, to the first and second pedals, respectively, causes the first and second chains to rotate the first and second sprockets, respectively, each mounted on the first shaft, thereby rotating the first shaft.

2. The drive system of claim 1, further comprising means for drivingly connecting the first shaft to a drive wheel of a bicycle so that rotation of the first shaft is imparted to the drive wheel to thereby propel the bicycle.

3. The drive system of claim 2, wherein the connecting means comprises a forward sprocket mounted on the first shaft, a rearward sprocket mounted to the drive wheel, and a chain drivingly connecting the forward and rearward sprockets.

4. The drive system of claim 1, wherein the first and second shafts are substantially vertically aligned.

5. A drive system for a bicycle, comprising:
    first and second parallel shafts rotatably mounted on the bicycle;
    first and second sprockets mounted on opposing ends of the first shaft;
    first and second sprockets mounted on opposing ends of the second shaft, wherein the first sprockets on the first and second shafts are co-planar, and wherein the second sprockets on the first and second shafts are co-planar;
    first and second pedals;
    first and second pedal sprockets for receiving respective first and second pedals;
    a first chain having a plurality of first links drivingly connecting together the first sprockets on the first and second shafts, a portion of which links are wrapped around the first pedal sprocket, thereby forming a first loop;
    a first master link for securing closure of the first loop so that the first pedal sprocket is secured therein;
    a second chain having a plurality of second links drivingly connecting together the second sprockets on the first and second shafts, a portion of which second links are wrapped around the second pedal sprocket, thereby forming a second loop;
    a second master link for securing closure of the second loop so that the second pedal sprocket is secured therein;
    wherein force applied to the first or second pedals generates a torque through the respective first or second sprockets mounted on the first shaft; and
    means for transmitting torque generated on the first shaft to a wheel of the bicycle to thereby impart rotation to the wheel.

6. The drive system of claim 5, wherein rotation of the wheel propels the bicycle.

7. The drive system of claim 6, wherein the transmitting means comprises a forward sprocket mounted on the first shaft, a rearward sprocket mounted to the drive wheel, and a third chain drivingly connecting the forward and rearward sprockets.

8. The drive system of claim 5, wherein the first and second shafts are substantially vertically aligned.

9. The drive system of claim 8, wherein the first shaft is positioned above the second shaft.

10. The drive system of claim 8, wherein the first shaft is positioned below the second shaft.

11. A drive system for a bicycle, comprising:
    first and second parallel vertically aligned shafts rotatably mounted on the bicycle;
    first and second sprockets mounted on opposing ends of the first shaft;

first and second sprockets mounted on opposing ends of the second shaft, wherein the first sprockets on the first and second shafts are co-planar, and wherein the second sprockets on the first and second shafts are co-planar;

first and second pedals;

first and second pedal sprockets for receiving respective first and second pedals, each pedal sprocket having a plurality of teeth;

a first chain having a plurality of first links drivingly connecting together the first sprockets on the first and second shafts, a portion of which links are wrapped around the first pedal sprocket, thereby forming a first loop of links which meshes with the teeth of the first pedal sprocket;

a first master link for securing closure of the first loop so that the first pedal sprocket is secured therein;

a second chain having a plurality of second links drivingly connecting together the second sprockets on the first and second shafts, a portion of which second links are wrapped around the second pedal sprocket, thereby forming a second loop of links which meshes with the teeth of the second pedal sprocket;

a second master link for securing closure of the second loop so that the second pedal sprocket is secured therein;

wherein force applied through a linear path to the first or second pedals generates a torque through the respective first or second sprockets mounted on the first shaft;

a forward sprocket mounted on the first shaft;

a rearward sprocket mounted to the drive wheel; and a chain drivingly connecting the forward and rearward sprockets so that torque generated from on the first shaft is transmitted to a drive wheel of the bicycle to thereby impart rotation to the drive wheel and propel the bicycle.

12. The drive system of claim 11, wherein the teeth of the first and second pedal sprockets are spaced so that the teeth do not mesh with the respective first and second master links, thereby avoiding interference with the first and second sprockets mounted on the first and second shafts.

13. A drive system, comprising:

a first rotating shaft;

a second rotating shaft;

a frame on which the first rotating shaft and the second rotating shaft are dislocatedly mounted in parallel;

a first sprocket mounted on the first shaft;

a second sprocket mounted on the second shaft;

a forward sprocket mounted on the first shaft;

a chain engaged with the first sprocket and the second sprocket for movement with rotation of the first sprocket and the second sprocket;

a rearward sprocket dislocatedly mounted on the frame from the first rotating shaft and the second rotating shaft;

a drive chain engaged with the forward sprocket and the rearward sprocket for movement with rotation of the forward sprocket and rearward sprocket;

a pedal; and a pedal sprocket attached to the pedal, the pedal sprocket engaging the chain to fix the pedal with the chain;

wherein movement of the pedal moves the chain, causing the first sprocket and the second sprocket to rotate, thereby causing the forward sprocket to rotate; and wherein rotation of the forward sprocket moves the drive chain, causing the rearward sprocket to rotate.

14. The drive system of claim 13, wherein the pedal sprocket includes circumferential tines, the chain wraps around the pedal sprocket engaging the tines so as to secure the pedal sprocket with the chain, and the pedal sprocket is missing at least one of the tines so that the chain at the pedal sprocket engages the first sprocket and the second sprocket as the pedal and the chain are moved.

* * * * *